US009969295B2

United States Patent
Mastrandrea

(10) Patent No.: US 9,969,295 B2
(45) Date of Patent: May 15, 2018

(54) COOLING SYSTEM DIRECTLY IN HOUSING

(71) Applicant: Thunder Power New Energy Vehicle Development Company Limited, Central (HK)

(72) Inventor: Francesco Mastrandrea, Milan (IT)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days. days.

(21) Appl. No.: 15/675,363

(22) Filed: Aug. 11, 2017

(65) Prior Publication Data
US 2018/0065500 A1  Mar. 8, 2018

Related U.S. Application Data

(60) Provisional application No. 62/384,298, filed on Sep. 7, 2016.

(51) Int. Cl.
*H01M 10/60* (2014.01)
*B60L 11/18* (2006.01)
*H01M 10/44* (2006.01)
*H02J 7/00* (2006.01)

(52) U.S. Cl.
CPC ....... *B60L 11/1874* (2013.01); *B60L 11/1879* (2013.01); *H01M 10/441* (2013.01); *B60L 11/1809* (2013.01); *H01M 2220/20* (2013.01); *H02J 7/0024* (2013.01)

(58) Field of Classification Search
CPC .............. B60L 11/1874; B60L 11/1879; B60L 11/1809; H01M 10/441; H01M 2220/20; H02J 7/0024
See application file for complete search history.

(56) References Cited

U.S. PATENT DOCUMENTS

| 2009/0075158 | A1  | 3/2009 | Rudorff et al. |
| 2009/0202897 | A1* | 8/2009 | Kim ................. H01M 2/1077 429/120 |
| 2011/0039142 | A1  | 2/2011 | Kwag et al. |
| 2013/0280564 | A1* | 10/2013 | Zheng ............... B60L 11/1874 429/62 |
| 2015/0044519 | A1* | 2/2015 | Rief .................. H01M 10/613 429/50 |

FOREIGN PATENT DOCUMENTS

DE    10 2010 032 936 A1    5/2012

OTHER PUBLICATIONS

European Search Report for EP 17 18 9836 dated Nov. 14, 2017, 7 pages.

* cited by examiner

*Primary Examiner* — Cynthia K Walls
(74) *Attorney, Agent, or Firm* — Kilpatrick Townsend & Stockton LLP

(57) ABSTRACT

A rechargeable battery system, a battery pack, and methods of manufacturing the same are disclosed herein. The rechargeable battery system and/or battery pack can be for an electric vehicle. The rechargeable battery system and/or battery pack can include a plurality of battery cells arranged into one or more rows, a busbar, and a housing. The housing can include a plurality of receptacles that can engage with the plurality of battery cells to secure a relative position of the plurality of battery cells with respect to each other. The housing can define a cooling duct in thermal connection with the plurality of receptacles.

14 Claims, 5 Drawing Sheets

COOLING SYSTEM DIRECTLY IN HOUSING

CROSS-REFERENCE TO RELATED APPLICATION

This application is a nonprovisional of and claims priority to U.S. Provisional Application No. 62/384,298, filed Sep. 7, 2016, the entire contents of which are hereby incorporated by reference for all purposes.

BACKGROUND

An electric vehicle uses one or more electric motors powered by electrical energy stored in a rechargeable battery pack. Lithium-based batteries are often chosen for their high power and energy density. In order to ensure that an electric vehicle operates efficiently and safely, the temperature of the battery pack must be maintained within a defined range of optimal temperatures. The coolant system of electric vehicle can be physically extended to the battery pack to remove excess heat, thereby increasing the service life of the battery pack and increasing the distance that can be traveled on a single charge.

As the popularity of electric vehicles increases, efficiency in the manufacturing process will become more important. Processes and devices that decrease the cost of manufacturing battery packs while simultaneously increasing their reliability and safety will be key to meeting customer demands. Specifically, there is a need for processes and devices that ensure reliable electrical connections between individual battery cells, that efficiently cool the battery pack, and that aid in the manufacturing process of assembling the thousands of individual battery cells into modular packs that can be installed and replaced when necessary.

BRIEF SUMMARY OF THE INVENTION

Aspects of the present disclosure relate to battery packs and methods of making and/or manufacturing the battery packs, and some aspects of the present disclosure relate to housing for receiving one or several battery and/or battery cells, and specifically to housings containing an integral cooling duct.

One aspect of the present disclosure relates to a battery pack for an electric vehicle. The battery pack can include a plurality of battery cells arranged into one or more rows. In some embodiments, each of the plurality of battery cells can include a first terminal and a second terminal. The battery pack can include a busbar that can conduct electrical energy to and from at least some of the plurality of battery cells, and a housing including a plurality of receptacles that can engage with the plurality of battery cells to secure a relative position of the plurality of battery cells with respect to each other. In some embodiments, the housing defines a cooling duct in thermal connection with the plurality of receptacles.

In some embodiments, the housing includes an entrance and an exit fluidly connected to the cooling duct of the housing. In some embodiments, the battery pack further comprises a heat exchanger fluidly connected to at least one of the entrance and the exit of the cooling duct. In some embodiments, the battery pack includes a cooling fluid contained within the heat exchanger and the cooling duct. In some embodiments, the cooling fluid can be a refrigerant.

In some embodiments, the housing includes a top and a bottom. In some embodiments, the receptacles are located in the top of the housing and comprise a plurality of cups. In some embodiments, the cooling duct extends at least partially around the receptacles. In some embodiments, the housing is non-conductive. In some embodiments, the cooling duct can maintain desired cooling across the entire housing.

One aspect of the present disclosure relates to a method of manufacturing a battery pack for an electric vehicle. The method includes arranging a plurality of battery cells into one or more rows. In some embodiments, each of the plurality of battery cells includes a first terminal and a second terminal. The method includes: positioning a busbar that can conduct electrical energy to and from at least some of the plurality of battery cells; and receiving the plurality of battery cells within a plurality of receptacles of a housing. In some embodiments, the receptacles can engage with the plurality of battery cells to secure a relative position of the plurality of battery cells with respect to each other. In some embodiments, the housing defines a cooling duct in thermal connection with the plurality of receptacles.

In some embodiments, the housing include an entrance and an exit fluidly connected to the cooling duct of the housing In some embodiments, the method includes fluidly connecting the entrance and exit of the cooling duct to a heat exchanger. In some embodiments, the method includes filling the heat exchanger and the cooling duct with a cooling fluid. In some embodiments, the cooling fluid can be a refrigerant.

In some embodiments, the housing includes a top and a bottom. In some embodiments, the receptacles are located in the top of the housing and can be a plurality of cups. In some embodiments, the cooling duct extends at least partially around the receptacles. In some embodiments, the housing is non-conductive. In some embodiments, the cooling duct can maintain desired cooling across the entire housing.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF THE INVENTION

Described herein are embodiments for providing a busbar comprising an integral busbar cooling duct. The integral busbar cooling duct simplify the design of a battery pack by eliminating the need for separate components for cooling the busbar and/or the battery cells in the battery pack. In some embodiments, the busbar cooling duct can define a volume through which a cooling fluid such as, for example, a refrigerant can flow. The cooling fluid can be liquid, gaseous, or a combination of liquid and gaseous.

In some embodiments, the busbar cooling duct can be fluidly connect to a cooling system that can include, for example, a heat exchanger. In some embodiments, the cooling system and/or the heat exchanger can be a part of the battery pack and/or can be separate from the battery pack.

The busbar cooling duct can comprise a variety of shapes and sizes. In some embodiments, the busbar cooling duct can comprise an elongate channel that can have, a polygonal cross-section, a circular cross-section, a semi-circular cross-section, and/or any other desired shape of cross-section. In some embodiments, the busbar cooling duct can be straight, curved, angled, zig-zag, serpentine, circular, or the like.

Figure 1:
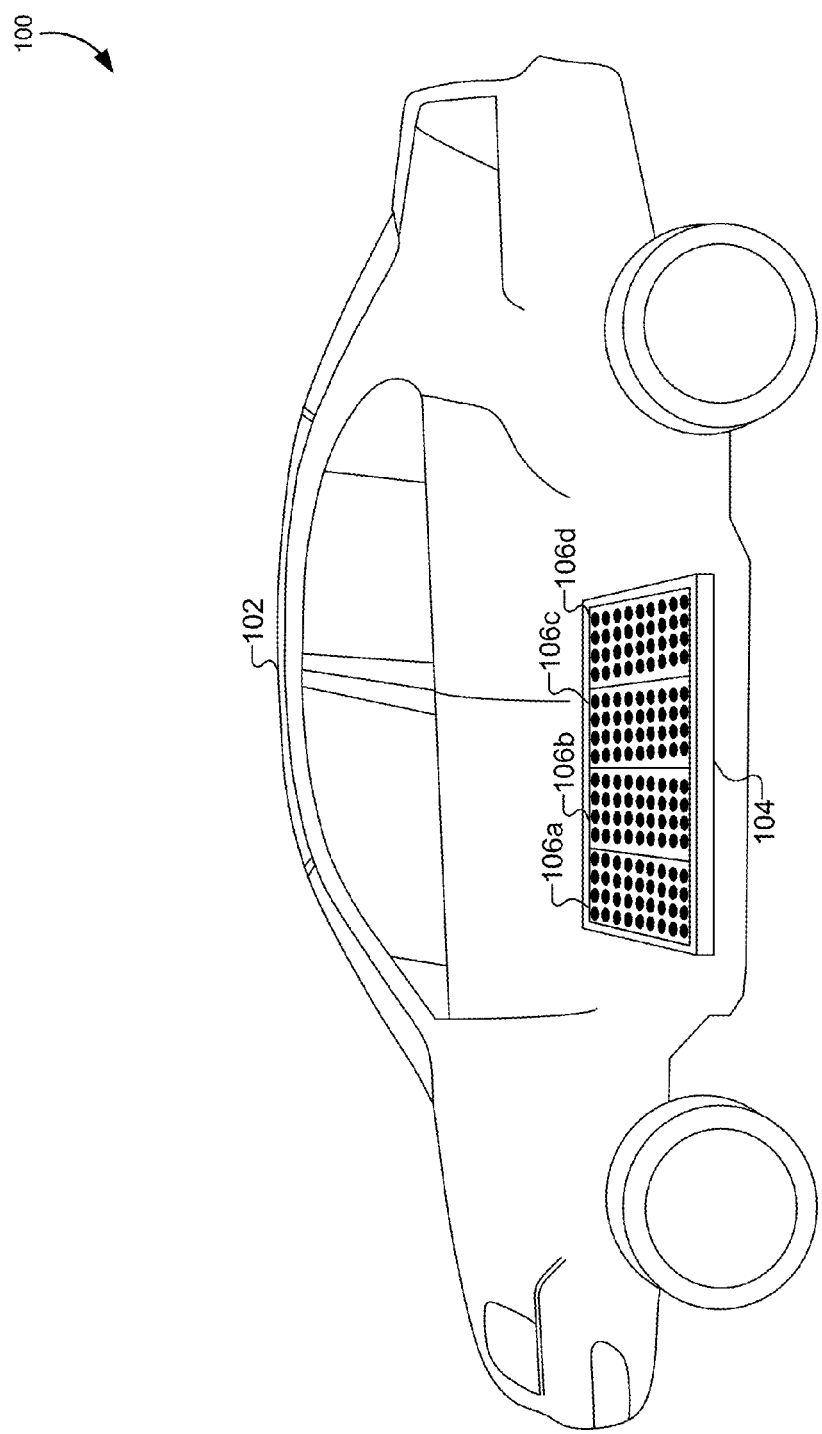
FIG. 1 illustrates a simplified diagram of an electric vehicle with a rechargeable battery system, according to some embodiments.

FIG. 1 illustrates a simplified diagram 100 of an electric vehicle 102 with a rechargeable battery system 104, according to some embodiments. The rechargeable battery system 104 may be comprised of one or more battery packs 106. A battery pack may be comprised of a plurality of individual battery cells that are electrically connected to provide a particular voltage/current to the electric vehicle 102. In some embodiments, the battery cells forming the battery pack can be arranged in one or several rows of battery cells. Depending on the embodiment, the electric vehicle 102 may include hybrid vehicles that operate using both fuel combustion and stored electric power, as well as fully electric vehicles that operate entirely from stored electric power.

The rechargeable battery system 104 represents a major component of the electric vehicle 102 in terms of size, weight, and cost. A great deal of effort goes into the design and shape of the rechargeable battery system 104 in order to minimize the amount of space used in the electric vehicle 102 while ensuring the safety of its passengers. In some electric vehicles, the rechargeable battery system 104 is located under the floor of the passenger compartment as depicted in FIG. 1. In other electric vehicles, the rechargeable battery system 104 can be located in the trunk or in the hood areas of the electric vehicle.

While a smaller number of larger battery cells could be more energy-efficient, the size and cost of these larger batteries are prohibitive. Furthermore, larger batteries require more contiguous blocks of space in the electric vehicle 102. This prevents larger batteries from being stored in locations such as the floor of the passenger compartment as depicted in FIG. 1. Therefore, some embodiments use a large number of smaller battery cells that are coupled together to generate electrical characteristics that are equivalent to single larger cells. The smaller cells may be, for example, the size of traditional AA/AAA batteries, and may be grouped together to form a plurality of battery packs 106. Each battery pack may include a large number of individual battery cells. In one embodiment, 700 individual lithium-ion batteries are joined together to form a single battery pack 106a, and the rechargeable battery system 104 may include four battery packs 106, eight battery packs, ten battery packs, sixteen battery packs, and/or the like, connected in parallel or series until the electrical requirements of the electric vehicle 102 are satisfied. The individual battery cells included in each battery pack 106 may total in the thousands for a single electric vehicle 102.

In some embodiments, the rechargeable battery system 104, and specifically one or several of the battery packs 106 can be connected to a heat exchanger 108 that can be a part of a cooling system 110. In some embodiments, the cooling system 110 can be part of the rechargeable battery system 104 and in some embodiments, the cooling system 110 can be separate from the rechargeable battery system 104. The cooling system 110 can include connecting lines 112 that can fluidly connect the heat exchanger 108 to one or several of the battery packs 106. The connecting lines 112 can include an inlet line 114 and an outlet line 116. The inlet line 114 can transport a cooling fluid, such as a refrigerant to the rechargeable battery system 104 and/or to one or several battery packs 106. In some embodiments, the cooling fluid can be contained in the cooling system 110, in the rechargeable battery system 104, and/or in one or several battery packs 106.

Figure 2:
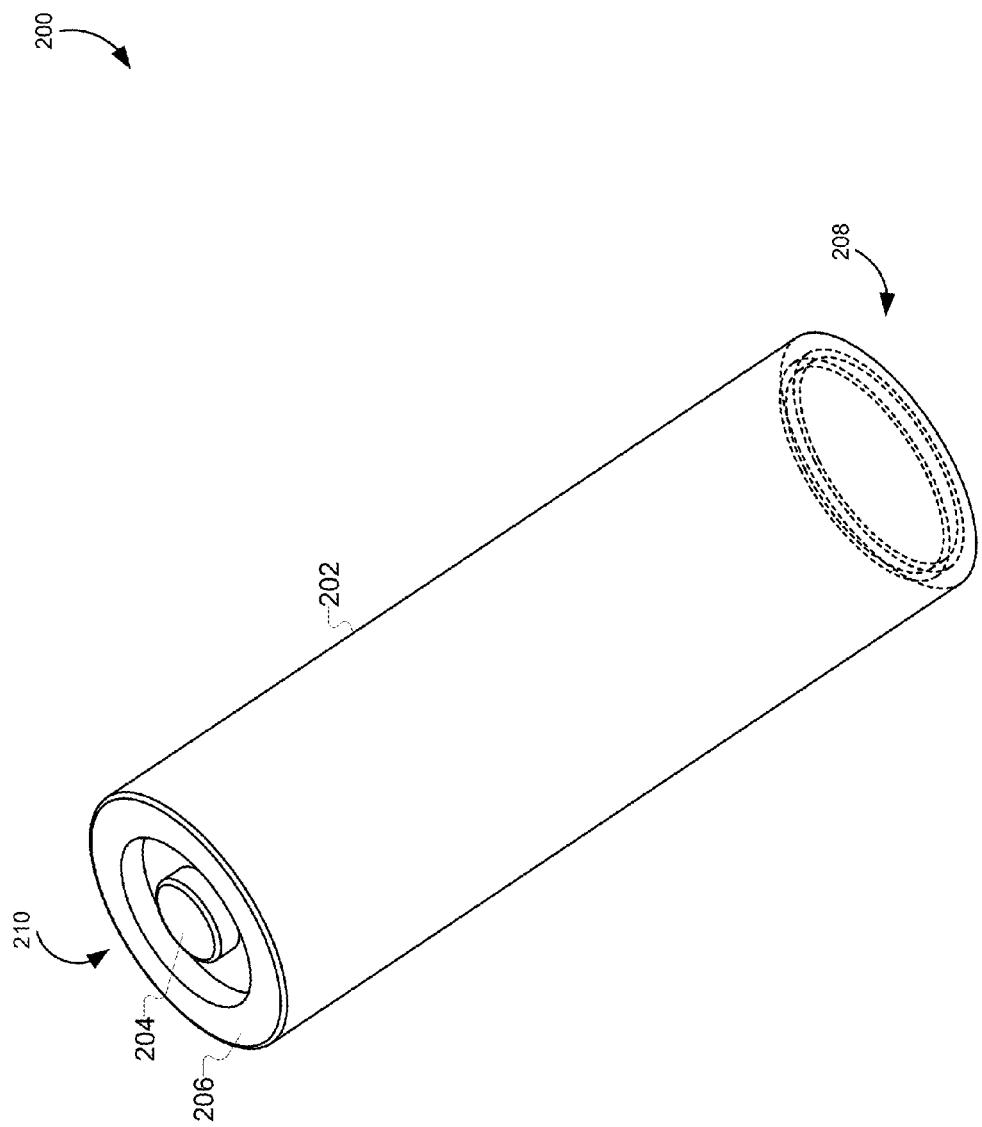
FIG. 2 illustrates a lithium-based battery that may be used in electric vehicles, according to some embodiments.

FIG. 2 illustrates a diagram 200 of a lithium-based battery 202 that may be used in electric vehicles, according to some embodiments. As used herein, the terms "battery", "cell", and "battery cell" may be used interchangeably to refer to any type of individual battery element used in a battery system. The batteries described herein typically include lithium-based batteries, but may also include various chemistries and configurations including iron phosphate, metal oxide, lithium-ion polymer, nickel metal hydride, nickel cadmium, nickel-based batteries (hydrogen, zinc, cadmium, etc.), and any other battery type compatible with an electric vehicle. For example, some embodiments may use the 6831 NCR 18650 battery cell from Panasonic®, or some variation on the 18650 form-factor of 6.5 cm×1.8 cm and approximately 45 g, or the 20700 form-factor of 7 cm×2 cm, or the 21700 form-factor of 7 cm×2.1 cm, or other desired form factor. The battery 202 may have at least two terminals. In some embodiments, a positive terminal 204 may be located at the top of the battery 202, and a negative terminal 206 may be located on the opposite bottom side of the battery 202. In some embodiments, each of the positive terminal 204 and the negative terminal 206 may be located on the same side of the battery such that, for example, as shown in FIG. 2 wherein the positive terminal 204 is a circular terminal and the negative terminal 206 is an annular terminal extending around the positive terminal 204.

In some embodiments in which the terminals 204, 206 of the cell 202 are located on different sides, some or all of the battery cells forming a battery pack 106 can be oriented in the same direction. In other words, the positive terminal of each of the individual battery cells faces in an upward direction relative to the battery pack, and each of the negative terminals faces in a downward direction. In other embodiments in which the terminals 204, 206 of the cell 202 are located on different sides, this need not be the case. Alternating rows of individual battery cells may be oriented in opposite direction such that the positive terminal of a first row is oriented in the up direction and the positive terminal of a second row is oriented in the downward direction. The orientation pattern for individual battery cells may vary without limitation. For example, every other battery cell in a row be oriented in opposite directions. In some embodiments, one half of the battery pack may have battery cells oriented in one direction, while the other half of the battery pack has cells oriented in the opposite direction. In any of these cases, connections may need to be established between batteries oriented in opposite directions or between batteries oriented in the same direction.

In order to make electrical connections between battery cells, a busbar may be used. As used herein, the term "busbar" refers to any metallic conductor that is connected to a plurality of individual battery cell terminals in order to transmit power from the individual battery cells to the electrical system of the electric vehicle. In some embodiments, the busbar may comprise a flat metallic sheet that is positioned on the top or the bottom of the battery pack. In some embodiments, the metallic sheet may cover an entire top or bottom of the battery pack, while in other embodiments, the busbar may comprise a strip that is longer than it is wide to interface with a single row of battery cells.

Figure 3:
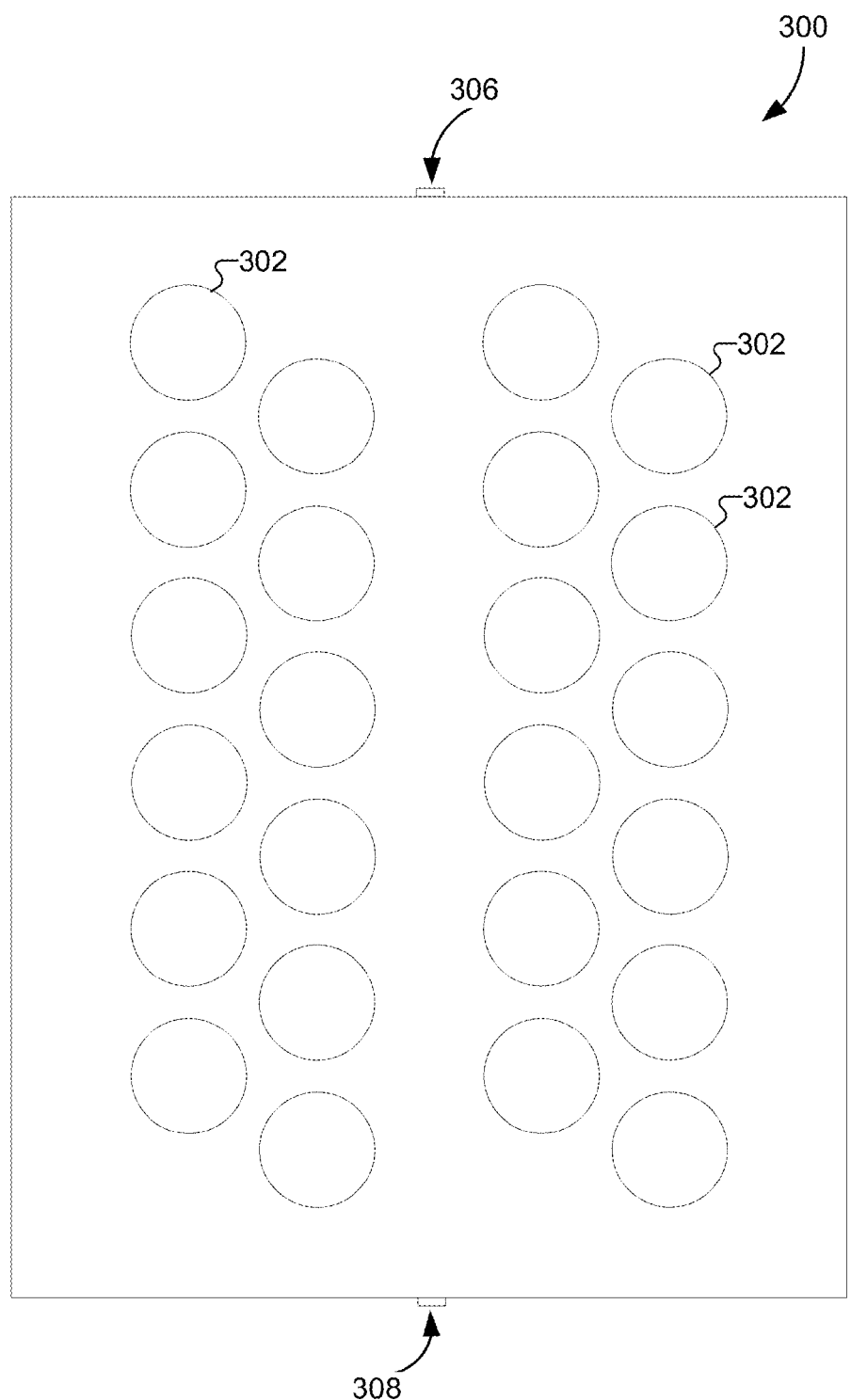
FIG. 3 is a top view of one embodiment of a bottom tray.

FIG. 3 is a top-view of one embodiment of an exemplary bottom tray 300, also referred to herein as a bottom carrier 300, a bottom cell holder 300, or a housing 300. The bottom tray 300 can comprise a variety of shapes and sizes and can be made from a variety of materials. In some embodiments, the bottom tray 300 can be made from one or several corrosion resistant materials that can have one or several desired heat transfer properties. In some embodiments, the bottom tray 300 can be made from a material that is electrically conductive, and in some embodiments, the bottom tray 300 can be made from a material that is electrically non-conductive.

The bottom tray 300 can include a plurality of receptacles 302. The plurality of receptacles 302 can comprise a variety of shapes and sizes. In some embodiments, the plurality of receptacles 302 can each comprise a cup or can be cup shaped. In some embodiments, each of the plurality of receptacles 302 can define a volume that can be, for example, cylindrical such as, circular cylindrical, rectangular cylindrical, triangular cylindrical, or the like.

The plurality of receptacles 302 can be configured to receive and hold a portion a battery cell such as the lithium battery 202. Thus, in some embodiments in which the receptacles are configured to receive and hold the lithium battery 202, the receptacles 302 can sized and shaped to securely receive one of the sides of the battery 202 such as, for example, a bottom 208 of the battery 202 or a top 210 of the battery. In some embodiments, the receptacles 302 can be configured to engage with the plurality of battery cells to secure a relative position of the plurality of battery cells with respect to each other. In some embodiments, the receptacles 302 can be sized so as to contact portions of the battery cell such as the lithium battery 202 when the battery cell is received with in the receptacle to facilitate heat transfer from the battery cell to the bottom tray 300.

The bottom tray 300 can include an inlet 306, also referred to herein as an entrance 306, and an outlet 308, also referred to herein as an exit 308. The bottom tray 300 can include one or several interior channels, also referred to herein as one or several fluidic ducts or cooling ducts, that can fluidly connect the inlet 306 and the outlet 308 such that the cooling fluid can flow into the bottom tray 300 via the inlet 306 and can flow out the bottom tray 300 via the outlet 308.

The one or several interior channels within the bottom tray 300 can comprise a variety of shapes and sizes. In some embodiments, the one or several cooling ducts can be in thermal connection with the plurality of receptacles. In some embodiments, the size and/or shape of the cooling duct can be selected based on the cooling desired for the bottom tray 300. Thus, in embodiments in which greater cooling is desired, the cooling duct can be sized and/or shaped to allow the through-flow of greater volumes of cooling fluid and/or can be sized and/or shaped to transport cooling fluid proximate to greater portions of the bottom tray 300. In some embodiments, the cooling duct can linearly extend from the entrance 306 to the exit 308, and in some embodiments, the cooling duct can non-linearly extend from the entrance 306 to the exit 308.

Figure 4:
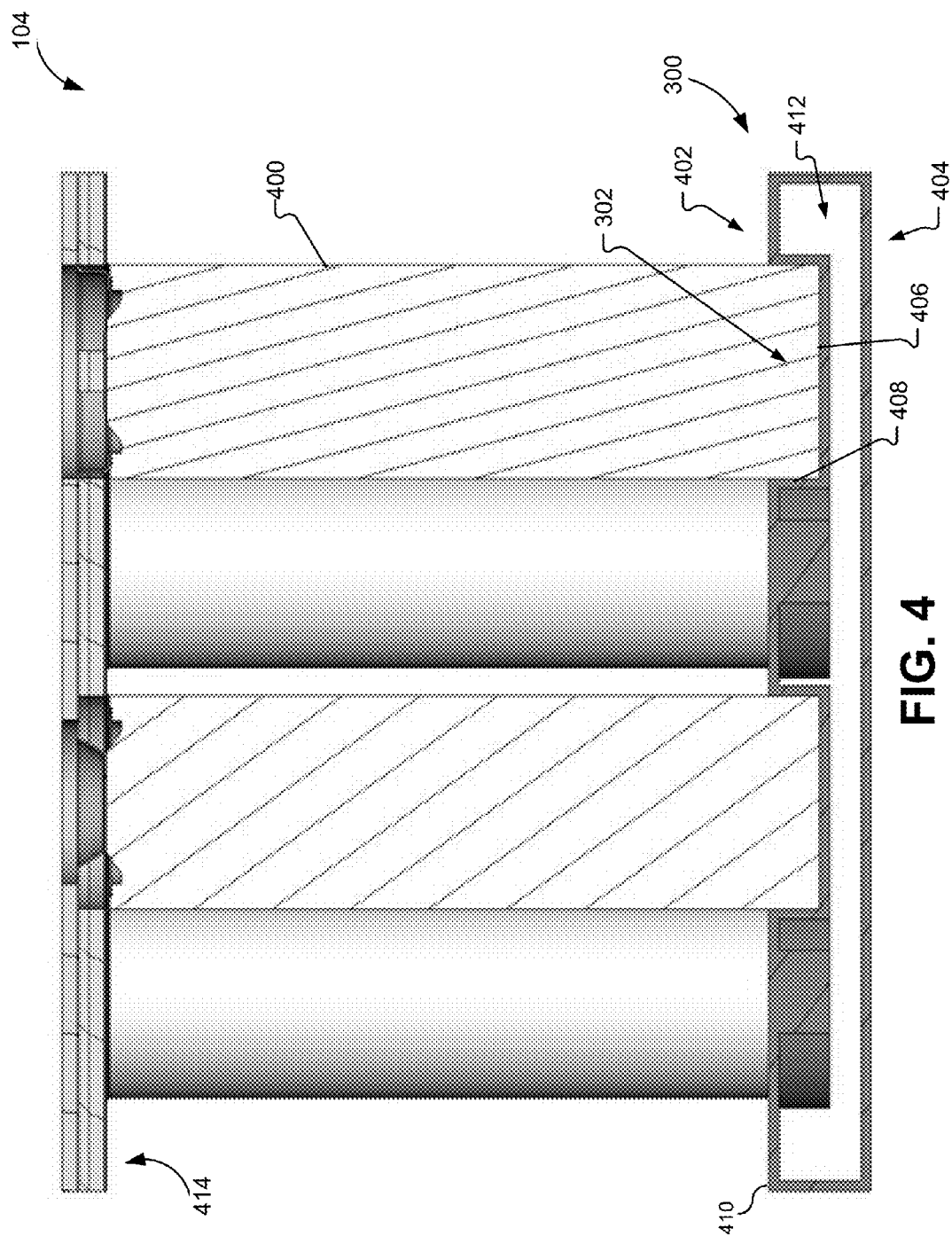
FIG. 4 is a section view of one embodiment of part of a rechargeable battery system including a bottom tray.

FIG. 4 is a perspective section view of one embodiment of the rechargeable battery system 104 including the bottom tray 300 holding a plurality of battery cells 400 that can be, for example, lithium-based batteries 202. The battery tray 300 has a top 402 and a bottom 404. As seen in FIG. 4, the receptacles 302 can be located in the top 402 of the bottom tray 300 and can extend towards the bottom 404 of the battery tray 300. As further seen in FIG. 4, the receptacles can comprise a bottom 406 and a wall 408 that can be, in some embodiments, a circumferential wall 408. In some embodiments, and as seen in FIG. 4, a portion of the battery cells 400 extends into the receptacle 302 and abuts the bottom 406 and the wall 408 of the receptacle 302.

As seen in FIG. 4, the bottom tray 300 includes the cooling duct 410 that can define a volume 412. The volume 412 and/or the cooling duct 410 can extend from the entrance 306 to the exit 308 of the bottom tray 300. In some embodiments, the cooling duct 410 and/or the volume 412 can extend wholly or partially around some or all of the receptacles 302.

In some embodiments, the volume 412 can contain all or portions of the cooling fluid including the refrigerant. Thus, in some embodiments, the cooling fluid and/or refrigerant can be contained with the cooling system 110 which can include the heat exchanger 108, and/or the cooling duct 410 and/or the internal volume 412. In some embodiments, the cooling duct 410 and/or the volume 412 can sized, shaped, and/or configured to maintain a desired temperature, heat exchange, and/or cooling across all or portions of the bottom tray 300.

In some embodiments, the one or several battery cells 400 can additionally contact a busbar 414. In some embodiments, the busbar 414 can contact the one or several battery cells 400 at another portion of the battery cells 400 than contacted by the bottom tray 300. In some embodiments, the busbar 414 can be electrically conductive and can connect some or all of the terminals of the battery cells 400.

Figure 5:
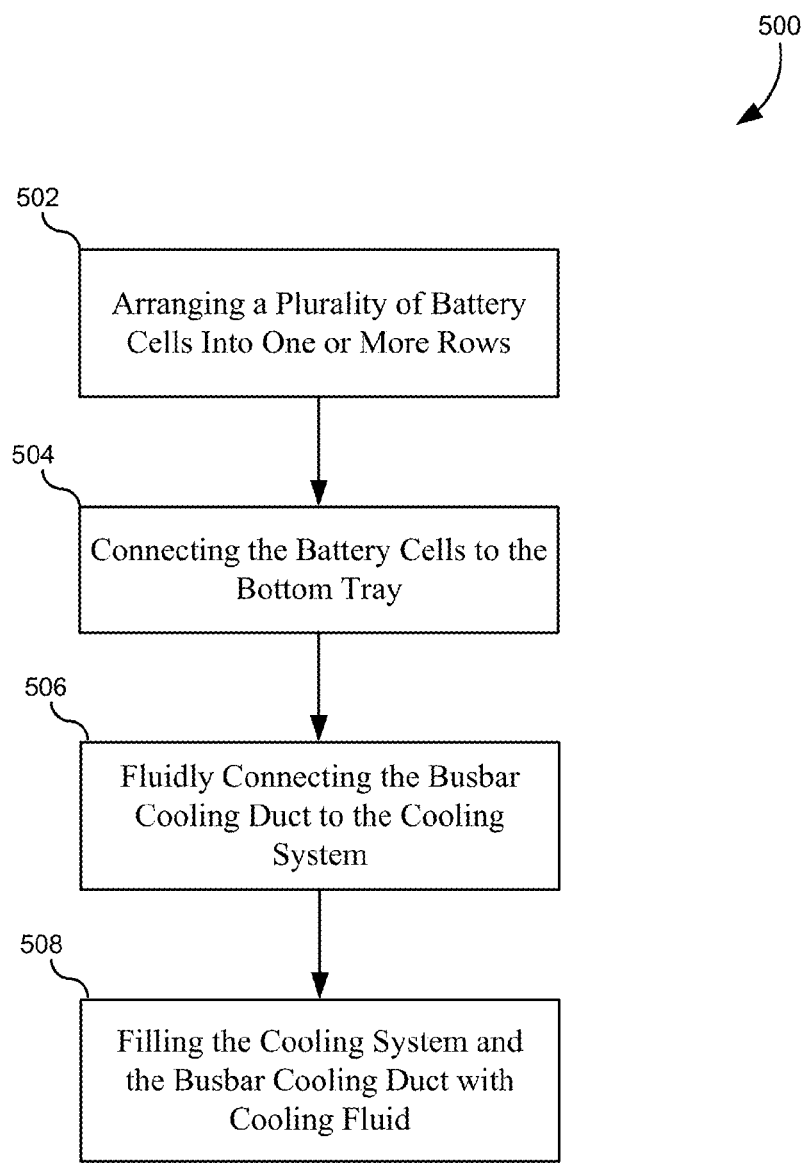
FIG. 5 is a flowchart illustrating one embodiment of a process for manufacturing a rechargeable battery system.

FIG. 5 is a flowchart illustrating one embodiment of a process 500 for manufacturing a rechargeable battery system 104 that can include, for example, the process for manufacturing one or several battery packs 106. The process begins at block 502, and may include arranging a plurality of battery cells into one or more rows.

In some embodiments, each of the plurality of battery cells may include a first terminal and the second terminal. For example, each cell may include a positive terminal and a negative terminal oriented on the same sides or on opposite sides of each of the individual battery cells. The plurality of battery cells may include a subset of battery cells with the first terminal oriented in the same direction in the battery pack. For example, a row of battery cells in the battery pack may form the recited subset of batteries. Each battery in that row may be oriented such that the positive terminal faces up relative to the battery pack, and the negative terminal faces down relative to the battery pack.

Alternatively, in some embodiments all of the battery cells may be oriented in the same direction such that the positive terminal of all of the battery cells faces up relative to the battery pack. In embodiments in which both the positive and negative terminals are on the same side of the battery, then the negative terminal likewise faces up relative to the battery pack in such a configuration.

The process 500 may also include connecting the battery cells to the bottom tray 300. In some embodiments, this can include inserting the battery cells into the receptacles 302 of the bottom tray 300, and specifically inserting each of the battery cells into a unique one of the receptacles 302 of the bottom tray 300. In some embodiments, the battery cells can be inserted into the receptacles 302 of the bottom tray 300 so as to maintain their orientation and/or arrangement from block 502, and in some embodiments, the step of block 502 can be performed by connecting the battery cells to the bottom tray 300.

In some embodiments, the connecting of the battery cells to the bottom tray can further include the connecting of the battery cells to the busbar 414, and specifically the electrical connecting of one or more of the terminals of the battery cells to the busbar 414. In some embodiments, this can include connecting some or all terminals of the battery cells to one or several contact of the busbar 414.

The process 500 may also include fluidly connecting the bottom tray 300, and specifically the cooling duct 410, and the cooling system as shown in block 506. In some embodiments, the fluid connecting of the bottom tray 300, and specifically the cooling duct 410 and the cooling system can include the fluid connecting of the bottom tray 300, and specifically the cooling duct 410 and the heat exchanger. In some embodiments, the fluid connecting of the bottom tray 300 and the cooling system can include connecting the bottom tray 300, and specifically the cooling duct 410 to the cooling system via the connecting lines and specifically via the inlet line and/or via the outlet line. In some embodiments, for example, connecting the inlet line to the entrance of the cooling duct and/or connecting the outlet line to the exit of the cooling duct.

The process 500 may also include filling the cooling system and the cooling duct with cooling fluid, which cooling fluid can be a refrigerant. In some embodiments, the filling of the cooling system and the cooling duct with cooling fluid can include filling the heat exchanger with cooling fluid. In some embodiments, the cooling system can be configured to circulate the cooling fluid through the cooling duct to maintain a desired temperature of the bottom tray 300 and/or in the battery cells.

It should be appreciated that the specific steps illustrated in FIG. 5 provide particular methods of providing a rechargeable battery system and/or a battery pack for an electric vehicle according to various embodiments of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A battery pack for an electric vehicle, the battery pack comprising:
    a plurality of battery cells arranged into one or more rows, wherein:
        each of the plurality of battery cells comprises a first terminal and a second terminal;
    a busbar configured to conduct electrical energy to and from at least some of the plurality of battery cells;
    a housing comprising a plurality of receptacles configured to engage with the plurality of battery cells to secure a relative position of the plurality of battery cells with respect to each other, wherein the housing defines a cooling duct in thermal connection with the plurality of receptacles, wherein the housing comprises an entrance and an exit fluidly connected to the cooling duct of the housing; and
    a heat exchanger fluidly connected to at least one of the entrance and the exit of the cooling duct,
    wherein the heat exchanger and the cooling duct comprise a cooling fluid contained therein.

2. The battery pack of claim 1, wherein the cooling fluid comprises a refrigerant.

3. The battery pack of claim 1, wherein the housing comprises a top and a bottom.

4. The battery pack of claim 3, wherein the receptacles are located in the top of the housing and comprise a plurality of cups.

5. The battery pack of claim 4, wherein the cooling duct extends at least partially around the receptacles.

6. The battery pack of claim 5, wherein the housing is electrically non-conductive.

7. The battery pack of claim 1, wherein the cooling duct is configured to maintain desired cooling across the entire housing.

8. A method of manufacturing a battery pack for an electric vehicle, the method comprising:
- arranging a plurality of battery cells into one or more rows, wherein each of the plurality of battery cells comprises a first terminal and a second terminal;
- positioning a busbar configured to conduct electrical energy to and from at least some of the plurality of battery cells;
- receiving the plurality of battery cells within a plurality of receptacles of a housing, wherein the receptacles are configured to engage with the plurality of battery cells to secure a relative position of the plurality of battery cells with respect to each other, wherein the housing defines a cooling duct in thermal connection with the plurality of receptacles, and wherein the housing comprises an entrance and an exit fluidly connected to the cooling duct of the housing;
- fluidly connecting the entrance and exit of the cooling duct to a heat exchanger; and
- filling the heat exchanger and the cooling duct with a cooling fluid.

9. The method of claim 8, wherein the cooling fluid comprises a refrigerant.

10. The method of claim 8, wherein the housing comprises a top and a bottom.

11. The method of claim 10, wherein the receptacles are located in the top of the housing and comprise a plurality of cups.

12. The method of claim 8, wherein the cooling duct extends at least partially around the receptacles.

13. The method of claim 12, wherein the housing is electrically non-conductive.

14. The method of claim 13, wherein the cooling duct is configured to maintain desired cooling across the entire housing.

* * * * *